United States Patent [19]

Namur

[11] Patent Number: 4,640,211

[45] Date of Patent: Feb. 3, 1987

[54] ADJUSTMENT FIXTURE FOR WISHBONE BOOMS BOARD-SAILING DEVICES

[75] Inventor: Marc Namur, Darmstadt-Eberstadt, Fed. Rep. of Germany

[73] Assignee: Schutz-Werke GmbH & Co. KG, Selters, Fed. Rep. of Germany

[21] Appl. No.: 714,061

[22] Filed: Mar. 20, 1985

[30] Foreign Application Priority Data

Mar. 20, 1984 [DE] Fed. Rep. of Germany ....... 3410152

[51] Int. Cl.$^4$ .............................................. B63H 9/08
[52] U.S. Cl. ...................................... 114/97; 403/109
[58] Field of Search .................................... 114/97–99, 114/39.2, 39; 403/104, 109; 248/423

[56] References Cited

U.S. PATENT DOCUMENTS 3,722,903  3/1973  Jones ................................... 403/109

FOREIGN PATENT DOCUMENTS 0071220  2/1983  European Pat. Off. .
7532773  7/1976  Fed. Rep. of Germany .
8133697  4/1982  Fed. Rep. of Germany .
2543510  10/1984  France ................................. 114/97
0063595  4/1983  Japan ................................. 114/39.2

Primary Examiner—Sherman D. Basinger
Attorney, Agent, or Firm—Young & Thompson

[57] ABSTRACT

An adjustment fixture for wishbone booms of board-sailing devices comprises two main tubes (1) joined at an acute angle on the mast side, and end tubes (3) telescopically adjustable therein, joined on the side of the stern leech rope. Each end tube (3) has several spaced-apart peripheral grooves (5). A locking ring (7) of rubber or the like is provided, which can engage respectively one of the peripheral grooves (5) and constitutes a tight seal between the main tube (1) and the end tube (3); this locking ring can be locked, with a locking part (6) shaped like an O-ring, into one of the peripheral grooves (5). A conical end section (9) of the locking ring (7) forms a readily handleable transition between the main tube (1) and the end tube (3).

5 Claims, 4 Drawing Figures

ADJUSTMENT FIXTURE FOR WISHBONE BOOMS BOARD-SAILING DEVICES

The invention relates to an adjustment fixture for wishbone booms of board-sailing devices in correspondence with the preamble of claim 1.

In order to be able to adapt the wishbone boom to different types of sails, it is known from European Laid-Open Application No. 0,071,220 to vary the length of the wishbone boom by more or less deeply insertable end tubes. This arrangement includes locking means with screw caps, eccentrics or pretensioned springs with detent lugs engaging into corresponding holes in rails. These conventional adjustment fixtures are complicated in their structure, cumbersome in handling, and form in the selected setting a rigid connection between main tube and end tube so that, under load on the wishbone boom, the boom is shortened in the spreading direction; this, in turn, unfavorably alters the profile of the sail. Besides, projecting edges occur, impairing the convenient handling of the wishbone boom.

The invention is based on the object of creating an adjustment fixture that is simple, safe and handleable with respect to construction and manipulation and which is designed so that, in case of a spreading load, there is no shortening of the wishbone boom.

This object has been attained according to this invention by the characterizing features of claim 1. Suitable further developments of the invention are characterized in the dependent claims.

The adjustment fixture of this invention, besides simplicity of construction and manipulation, exhibits still other advantages: No metal-to-metal fitting is required which could produce rattling. The transition between the main tube and the end tube is well sealed against water and dirt particle penetration (sand and the like) and is easily handleable so that there is no danger of injury due to sharp edges, pins, or the like. The locking effected in the insertion direction is completely secure, and in the construction of the entire rigging, the member of foam material in the interior of the tubes prevents unintended slipping out of the end tube from the main tube. Any dirt particles that will occasionally penetrate are cleaned out in their entirety by the foam member when the tubes are pulled apart. As was found in tests and during practical usage, a quite decisive advantage resides in that the wishbone boom is not reduced in length under load, and the sail remains continuously taut.

Embodiments of the invention are illustrated in the drawings wherein.

Figure 1:
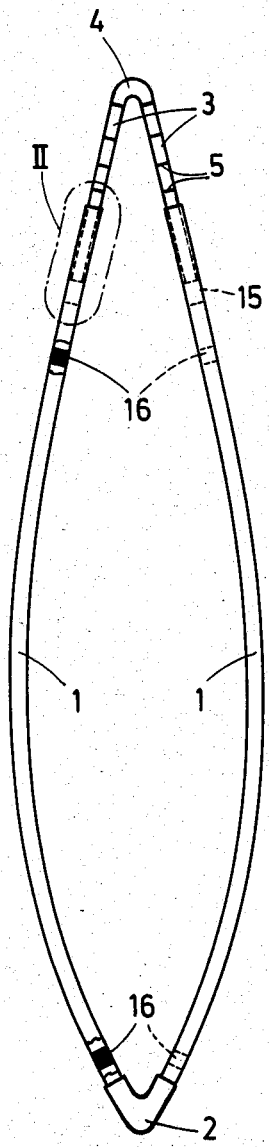
FIG. 1 is a top view of a wishbone boom.

The wishbone boom illustrated in FIG. 1 consists essentially of two main tubes 1 joined under an acute angle on the mast side by way of a connecting member 2, and of two end tubes 3 accommodated in a telescope fashion by the main tubes 1 and joined together by way of an elastic connecting member 4.

The wishbone boom is mounted with the connecting member 2 at the mast of a board-sailing device (not shown) and is held together by the sail rigging extending from the corner between the stern leech rope and the lower leech rope of the sail to the connecting member 4.

Each end tube 3 exhibits several spaced-apart, indented peripheral grooves 5 which can be engaged by a locking part 6 of an O-ring shape pertaining to a locking ring generally denoted by 7, when the wishbone boom is assembled and is to be adjusted to the length corresponding to the respective sail. In the embodiment of the locking ring 7 according to FIG. 2, a cylindrical intermediate annular sleeve 8 adjoins the O-ring-shaped locking member 6 of the integrally constructed locking ring 7, and a conical end section 9 constitutes the termination, there being a radially outwardly extending annular surface 10 between the outer surface of the cylindrical intermediate member 8 and the conical end section 9. The radial width of this annular surface corresponds to the wall thickness of the main tube 1 and forms a flush abutment for a widened end 11 of this main tube. The outer diameter of the cylindrical intermediate member 8 corresponds to the inner diameter of the widened end 11 of the main tube 1. As can be seen, a readily handleable transition is formed between the main tube 1 and the end tube 3, from the radial annular surface 10 via the conical end section 9, this transition being furthermore watertight. The locking member 6 of an O-ring shape also contributes substantially toward this aim, this locking member being in firm contact with the inclined transition of the widened end 11 of the main tube 1 when the sail is rigged (not shown).

Figure 2:
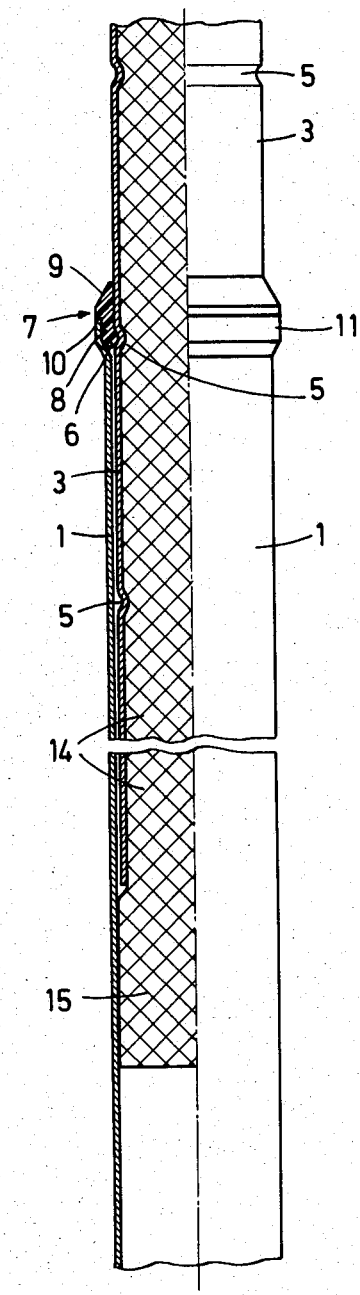
FIG. 2 shows an enlarged fragmentary view in the zone of the oval II in dot-dash lines depicted in FIG. 1, with a first embodiment of the adjustment fixture.
Figure 3:
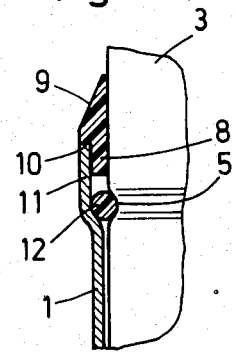
FIG. 3 shows a second embodiment, in a still further enlarged fragmentary view.

FIG. 3 shows a version of the adjustment fixture wherein a separate O-ring 12 is provided as the locking member, while the cylindrical intermediate member 8 and the conical end section 9 are fashioned integrally as in the embodiment of FIG. 2 and, again, constitute a convenient to handle transition.

Figure 4:
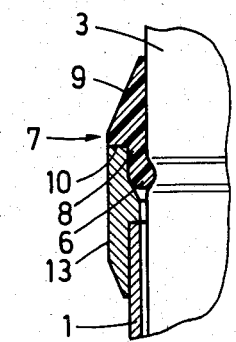
FIG. 4 shows a third embodiment.

In the embodiment of FIG. 4, the same locking ring 7 is again employed as in the embodiment of FIG. 2, but in this case a separate profiled ring 13 of a metal or a synthetic resin is placed on the end of the main tube 1 which has not been widened. Thus, in this embodiment there is the possibility of still further reducing the length of the main tube 1, if desired. Although this embodiment is possible, it is not preferred due to the somewhat problematic sealing between the profiled ring 13 and the main tube 1, even though an O-ring (not shown) could be inserted in an inner circumferential groove (likewise not shown) of the profiled ring 13.

As illustrated in FIG. 2, in particular, a member 14 of a foam material is provided in the end tube 3 in the adjustment zone; this member 14 projects with a piston-like flaring partial section 15 out of the end tube 3. This piston-like partial section 15 is, when the tubes 1,3 are telescoped, in tight contact with the inner surface of the main tube, preventing during assembly an unintended slipping out of the end tube 3 from the main tube 1, so that a slight pulling force must be exerted while pulling the end tube 3 out of the main tube. During the pulling-out step, the piston-like partial section 15 of the foam member 14 furthermore has a cleaning effect in that is sweeps out any dirt that may have penetrated.

As illustrated in FIG. 1, plugs 16 of rubber or the like are provided, as is conventional, outside of the adjustment zone in the main tube 1, so that the main tube is not filled up with water and thus does not increase in its weight.

I claim:

1. In a wishbone boom of the type comprising two main tubes joined at an acute angle, said main tubes each comprising an integral end portion having an end surface, and two end tubes telescopingly adjustable in said main tubes, said end tubes comprising a plurality of spaced, circumferential grooves; the improvement comprising an adjustment fixture comprising: an O-ring adapted to be received in any one of said plurality of grooves; and an annular sleeve adapted to be radially interposed between said end portion of said main tube and said end tube, said annular sleeve comprising a radially outwardly extending portion designed to abut against said end surface of said main tube and a conical portion extending radially inward and axially from said abutment portion, said O-ring being formed integrally with said annular sleeve axially opposite said abutment portion, and said O-ring extending radially inwardly of said annular sleeve.

2. Wishbone boom according to claim 1, wherein each said end tube comprises a foam member (14) extending into its interior, said foam member (14) comprising a radially outwardly flared end portion (15) projecting from the end of said end tube and contacting, in the mounted condition, the inner wall of each said main tube.

3. In a wishbone boom of the type comprising two main tubes joined at an acute angle, said main tubes each comprising an integral end portion having an end surface, and two end tubes telescopingly adjustable in said main tubes, said end tubes comprising a plurality of spaced, circumferential grooves; the improvement comprising an adjustment fixture comprising: an O-ring adapted to be received in any one of said plurality of grooves; and an annular sleeve adapted to be radially interposed between said end portion of said main tube and said end tube, said annular sleeve comprising a radially outwardly extending portion designed to abut against said end surface of said main tube and a conical portion extending radially inward and axially from said abutment portion, said end portion of each said main tube being flared radially outwardly and forming an interior abutment surface designed to abut against said O-ring.

4. Wishbone boom according to claim 3, wherein said O-ring is formed separately from said annular sleeve, and said conical portion of said abutment portion are formed integrally with said annular sleeve.

5. Wishbone boom according to claim 3, wherein each said end tube comprises a foam member (14) extending into its interior, said foam member (14) comprising a radially outwardly flared end portion (15) projecting from the end of said end tube and contacting, in the mounted condition, the inner wall of each said main tube.

* * * * *